(12) United States Patent
Lochocki, Jr. et al.

(10) Patent No.: US 10,518,778 B2
(45) Date of Patent: Dec. 31, 2019

(54) CONTROL SYSTEM FOR A CONTINUOUSLY VARIABLE TRANSMISSION IN A VEHICLE PROPULSION SYSTEM

(71) Applicant: GM GLOBAL TECHNOLOGY OPERATIONS LLC, Detroit, MI (US)

(72) Inventors: Ronald F Lochocki, Jr., Ypsilanti, MI (US); Christopher J Weingartz, Fenton, MI (US); Bret J Keller, Plymouth Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 197 days.

(21) Appl. No.: 15/791,681

(22) Filed: Oct. 24, 2017

(65) Prior Publication Data

US 2019/0118816 A1 Apr. 25, 2019

(51) Int. Cl.
*B60W 30/188* (2012.01)
*B60W 10/06* (2006.01)
*B60W 10/107* (2012.01)

(52) U.S. Cl.
CPC .......... *B60W 30/188* (2013.01); *B60W 10/06* (2013.01); *B60W 10/107* (2013.01); *B60W 2510/0652* (2013.01); *B60W 2510/0695* (2013.01); *B60W 2510/1005* (2013.01); *B60W 2540/10* (2013.01); *B60W 2710/0666* (2013.01); *B60W 2710/1005* (2013.01); *B60W 2710/105* (2013.01); *B60W 2720/30* (2013.01)

(58) Field of Classification Search
None
See application file for complete search history.

(56) References Cited

U.S. PATENT DOCUMENTS

| | | | | |
|---|---|---|---|---|
| 5,042,324 A | * | 8/1991 | Suzuki | B60W 10/06 477/109 |
| 6,721,643 B1 | | 4/2004 | Hanggi et al. | |
| 7,524,265 B2 | * | 4/2009 | Scelers | B60W 30/1884 477/110 |
| 8,234,049 B2 | * | 7/2012 | Stempnik | F02D 41/0002 123/376 |
| 8,690,730 B2 | | 4/2014 | Wright et al. | |
| 2015/0239476 A1 | * | 8/2015 | Inoue | B60W 10/04 701/52 |
| 2017/0138471 A1 | * | 5/2017 | Vu | F16H 9/18 |
| 2019/0047566 A1 | * | 2/2019 | Miller | B60W 10/06 |

* cited by examiner

*Primary Examiner* — Justin Holmes

(57) ABSTRACT

A vehicle propulsion system includes a prime mover having a prime mover output shaft, a continuously variable transmission having a variator input shaft coupled to the prime mover output shaft and having a variator output shaft, a driver torque request module in communication with a driver input and for outputting a driver torque request, an engine backbone in communication with the prime mover, and a transmission backbone in communication with the continuously variable transmission and the engine backbone in the vehicle propulsion system. The transmission backbone includes a positive torque request module that generates a positive torque request, and a positive torque request monitor that limits a torque request from the transmission backbone to the engine backbone to a maximum of a predetermined threshold.

17 Claims, 4 Drawing Sheets

CONTROL SYSTEM FOR A CONTINUOUSLY VARIABLE TRANSMISSION IN A VEHICLE PROPULSION SYSTEM

FIELD

The present disclosure relates to a control system for a continuously variable transmission in a vehicle propulsion system.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Vehicle propulsion systems having a prime mover, such as, for example, an internal combustion engine, coupled to a continuously or infinitely variable transmission (CVT) may be employed to provide tractive effort in vehicles. A CVT is capable of continuously changing an input/output speed ratio over a range between a minimum (underdrive) ratio and a maximum (overdrive) ratio, thus permitting infinitely variable selection of engine operation that achieves a preferred balance of fuel consumption and engine performance in response to an operator torque request.

Known chain-type continuously variable transmissions may include two pulleys, each having two sheaves. A chain or belt may run between the two pulleys, with the two sheaves of each of the pulleys sandwiching the chain between them. Frictional engagement between the sheaves of each pulley and the chain couples the chain to each of the pulleys to transfer torque from one pulley to the other. One of the pulleys may operate as a drive or input pulley, and the other pulley may operate as a driven or output pulley. The gear ratio (also known as a torque ratio) is the ratio of the torque of the driven (output) pulley to the torque of the drive (input) pulley. The gear ratio may be changed by urging the two sheaves of one of the pulleys closer together and urging the two sheaves of the other pulley farther apart from each other, causing the chain to ride higher or lower on the respective pulley. The gear ratio may also be obtained by dividing a transmission input rotation speed by a transmission output rotation speed. The target gear ratio may be determined based upon a number of factors including, for example, the driver pedal input, the vehicle speed and the like, without limitation.

SUMMARY

In an exemplary aspect, a vehicle propulsion system includes a prime mover having a prime mover output shaft, a continuously variable transmission having a variator input shaft coupled to the prime mover output shaft and having a variator output shaft, a driver torque request module in communication with a driver input and for outputting a driver torque request, an engine backbone in communication with the prime mover, and a transmission backbone in communication with the continuously variable transmission and the engine backbone in the vehicle propulsion system. The transmission backbone includes a positive torque request module that generates a positive torque request, and a positive torque request monitor that limits a torque request from the transmission backbone to the engine backbone to a maximum of a predetermined threshold.

In this manner, drivability and smoothness of a downshift in a vehicle propulsion system having a continuously variable transmission may be improved while maintaining full protection, rationalization and security of torque values. Monitoring a torque request in a transmission backbone before forwarding that request to an engine backbone improves responsiveness, accuracy, smoothness and drivability. Further, this obviates the necessity of any monitoring or screening in an engine backbone and avoids any requirement for subjecting torque requests that might exceed a driver requested torque to timers.

In another exemplary aspect, the torque request is a sum of the driver torque request and the positive torque request.

In another exemplary aspect, the positive torque request module determines the positive torque request based upon an engine acceleration and an engine inertia.

In another exemplary aspect, the positive torque request module determines the positive torque request during a decrease in speed ratio of the continuously variable transmission such that a net torque at an axle of the vehicle propulsion system substantially matches a driver requested axle torque.

In another exemplary aspect, the driver requested axle torque corresponds to the driver torque request.

In another exemplary aspect, the positive torque request monitor limits a torque request from the transmission backbone to the engine backbone to a maximum of a predetermined threshold from a table of predetermined threshold values.

In another exemplary aspect, the positive torque request monitor determines the predetermined threshold from the table based upon an engine acceleration and a ratio of the continuously variable transmission.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
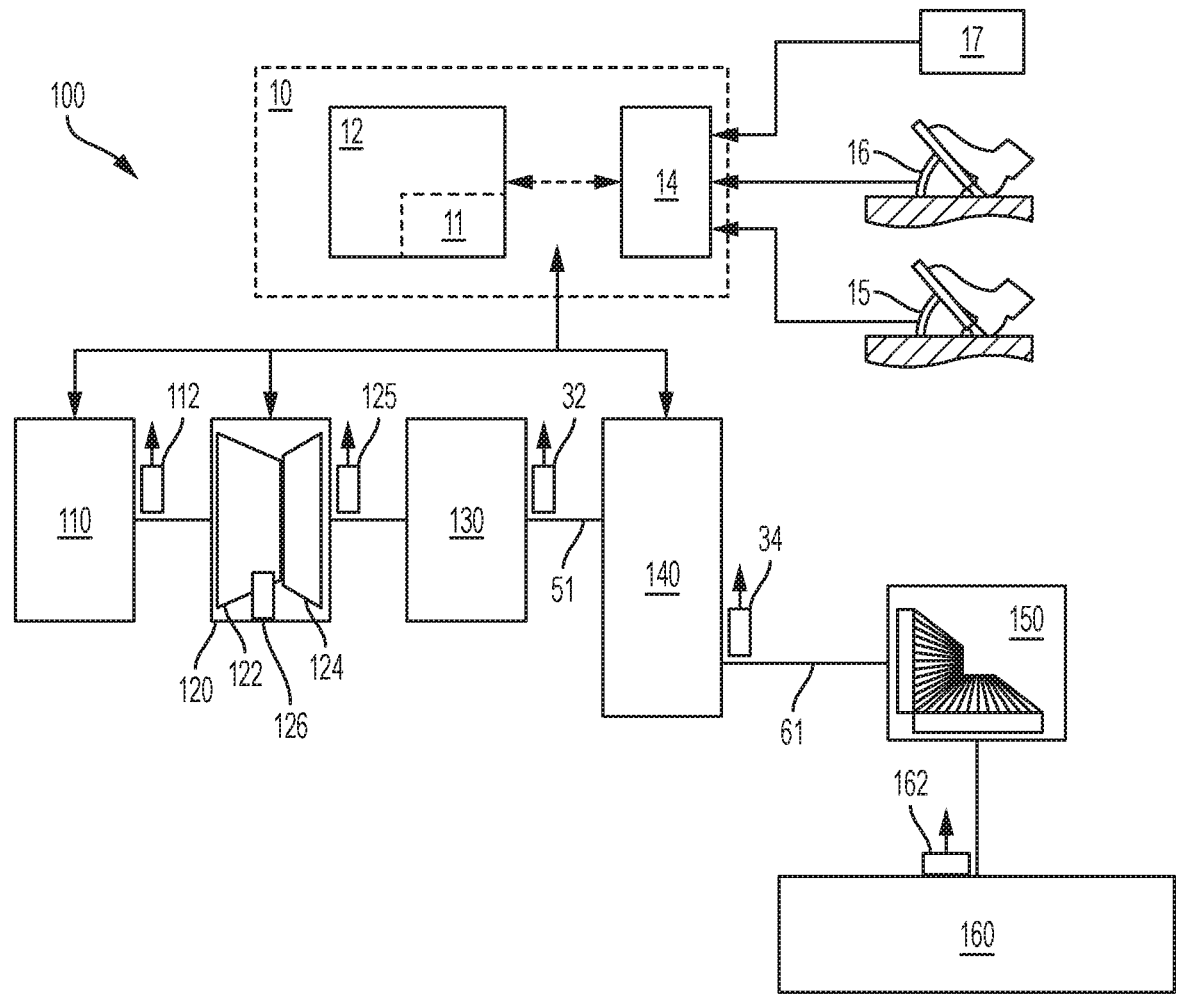
FIG. 1 schematically illustrates elements of a vehicle propulsion system 100.

Referring now to the drawings, wherein the depictions are for the purpose of illustrating certain exemplary embodiments only and not for the purpose of limiting the same, FIG. 1 schematically illustrates elements of a vehicle propulsion system 100 that includes a prime mover 110 rotatably coupled to a continuously variable transmission (CVT) 140 via a torque converter 120 and a gear box 130. The vehicle propulsion system 100 couples via a driveline 150 to a vehicle wheel 160 to provide tractive effort when employed on a vehicle. Operation of the vehicle propulsion system 100 is monitored by and controlled by a control system 10 in response to driver commands and other factors.

The prime mover 110 may be, for example, an internal combustion engine, a motor, or any other system without limitation that is capable of generating torque in response to commands originating from the control system 10. The torque converter 120 may provide a fluid coupling between its input and output members for transferring torque, and preferably may include a pump 122 that is coupled to the prime mover 110, a turbine 124 that is coupled via the output member to the gear box 130 and a torque converter clutch 126 that locks rotation of the pump 122 and turbine 124 and is controllable by the control system 10. The output member of the torque converter 120 rotatably couples to the gear box 130, which may include meshed gears or other suitable gearing mechanisms that provide reduction gearing between the torque converter 120 and the CVT 140. Alternatively, the gear box 130 may be another suitable gear configuration for providing gearing between the engine 110, the torque converter 120 and the CVT 140, including, by way of non-limiting examples, a chain drive gear configuration or a planetary gear configuration. In alternative embodiments, either or both the torque converter 120 and the gear box 130 may be omitted.

The gear box 130 may include an output member that rotatably couples to the CVT 140 via an input member 51. One exemplary embodiment of the CVT 140 is described with reference to FIG. 2. An output member 61 of the CVT 140 rotatably couples to the driveline 150, which rotatably couples to the vehicle wheels 160 via an axle, half-shaft or another suitable torque transfer element. The driveline 150 may include a differential gearset, a chain drive gearset or another suitable gear arrangement for transferring torque to one or more vehicle wheels 160.

The vehicle propulsion system 100 preferably includes one or more sensing devices for monitoring rotational speeds of various devices, including, e.g., an engine speed sensor 112, a torque converter turbine speed sensor 125, a CVT variator input speed sensor 32, a CVT variator output speed sensor 34, and a wheel speed sensor 162, through which vehicle speed (Vss) is monitored. Each of the aforementioned speed sensors may be any suitable rotation position/speed sensing device, such as, for example, a Hall-effect sensor. Each of the aforementioned speed sensors communicates with the control system 10.

The control system 10 preferably includes one or a plurality of controllers 12 and a user interface 14. A single controller 12 is shown for ease of illustration. The controller 12 may include a plurality of controller devices, wherein each of the controllers 12 is associated with monitoring and controlling a single system. This may include an engine control module (ECM) for controlling the engine 110, and a transmission controller (TCM) for controlling the CVT 140 and monitoring and controlling a single subsystem, e.g., a torque converter clutch. The controller 12 preferably includes a memory device 11 containing executable instruction sets. The user interface 14 communicates with operator input devices including, e.g., an accelerator pedal 15, a brake pedal 16 and a transmission gear selector 17.

Figure 2:
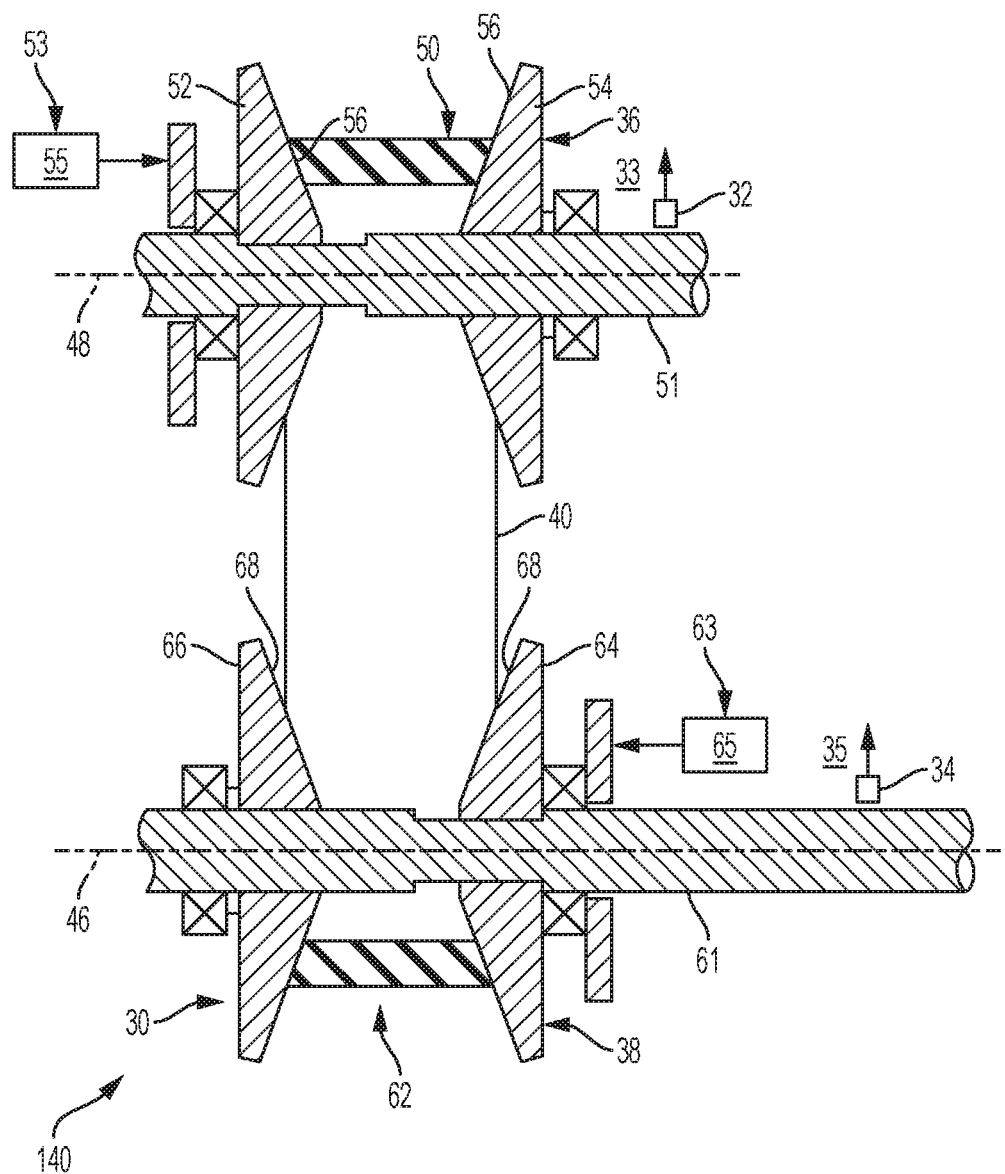
FIG. 2 schematically illustrates elements of a variator 30 of a chain-type continuously variable transmission (CVT)

FIG. 2 schematically illustrates elements of a variator 30 of a chain-type continuously variable transmission (CVT) 140 that is advantageously controlled by a controller 12. The variator 30 transfers torque between the first rotating member 51 and the second rotating member 61. The first rotating member 51 may be referred to as an input member 51, and the second rotating member 61 may be referred to as an output member 61.

The variator 30 includes a first, or primary pulley 36, a second, or secondary pulley 38 and flexible continuous rotatable device 40 that rotatably couples the first and second pulleys 36, 38 to transfer torque between them. The first pulley 36 rotatably attaches to the input member 51 and the second pulley 38 rotatably attaches to the output member 61, and the rotatable device 40 is adapted to transfer torque between the first and second pulleys 36, 38 and thus between the input and output members 51, 61. The first pulley 36 and input member 51 rotate about a first axis 48, and the second pulley 38 and output member 61 rotate about a second axis 46. The continuous rotatable device 40 may be a belt, a chain, or another suitable flexible continuous device, without limitation.

The first pulley 36 is split perpendicular to the first axis 48 to define an annular first groove 50 that is formed between a moveable sheave 52 and a stationary sheave 54. The moveable sheave 52 axially moves or translates along the first axis 48 relative to the stationary sheave 54. For example, the moveable first sheave 52 may be attached to the input member 51 via a splined connection, thereby allowing axial movement of the moveable first sheave 52 along the first axis 48. The stationary first sheave 54 is disposed opposite the moveable first sheave 52. The stationary first sheave 54 is axially fixed to the input member 51 along the first axis 48. As such, the stationary first sheave 54 does not move in the axial direction of the first axis 48. The moveable first sheave 52 and the stationary first sheave 54 each include a first groove surface 56. The first groove surfaces 56 of the moveable first sheave 52 and the stationary first sheave 54 are disposed opposite each other to define the annular first groove 50. The opposed first grooved surfaces 56 preferably form an inverted frusto-conical shape such that a movement of the moveable first sheave 52 towards the stationary first sheave 54 increases an outer pulley diameter of the annular first groove 50. An actuator 55 is arranged with the first pulley 36 to control an axial position of the moveable first sheave 52 in response to a drive signal 53, including urging the moveable first sheave 52 towards the stationary first sheave 54. In one embodiment, the actuator 55 is a hydraulically-controlled device and the drive signal 53 is a hydraulic pressure signal.

The second pulley 38 is split perpendicular to the second axis 46 to define an annular second groove 62. The annular second groove 62 is disposed perpendicular to the second axis 46. The second pulley 38 includes a moveable sheave 64 and a stationary sheave 66. The moveable sheave 64 axially moves or translates along the second axis 46 relative to the stationary sheave 66. For example, the moveable second sheave 64 may be attached to the output member 61 via a splined connection, thereby allowing axial movement of the moveable second sheave 64 along the second axis 46. The stationary second sheave 66 is disposed opposite the moveable second sheave 64. The stationary second sheave 66 is axially fixed to the output member 61 along the second axis 46. As such, the stationary second sheave 66 does not move in the axial direction of the second axis 46. The moveable second sheave 64 and the stationary second sheave 66 each include a second groove surface 68. The second groove surfaces 68 of the moveable second sheave 64 and the stationary second sheave 66 are disposed opposite each other to define the annular second groove 62. The opposed second grooved surfaces 68 preferably form an inverted frusto-conical shape such that a movement of the moveable second sheave 64 towards the stationary second sheave 66 increases an outer pulley diameter of the annular second groove 62. An actuator 65 is arranged with the second pulley 38 to control an axial position of the moveable second sheave 64 in response to a driven signal 63, including urging the moveable second sheave 64 towards the stationary second sheave 66. In one embodiment, the actuator 65 is a hydraulically-controlled device and the driven signal 63 is a hydraulic pressure signal. A ratio of the outer pulley diameter of the first pulley 36 and the outer pulley diameter of the second pulley 38 defines a speed ratio (SR). Other elements, such as clutch assemblies in the form of selectable one-way clutches and the like may be deployed between the variator 30 and other vehicle propulsion system and driveline components and systems.

Various sensors are suitably positioned for sensing and providing signals related to operation of the CVT 140, including the CVT variator input speed sensor 32 and the CVT variator output speed sensor 34. The input speed sensor 32 may be mounted near the input member 51 to generate an input speed signal 33, and the CVT variator output speed sensor 34 may be mounted near the output member 61 to generate an output speed signal 35.

The speed ratio (SR) is a ratio of the speed of the output member 61 in relation to the speed of the input member 51. Forms of the SR may be employed as a control parameter for the CVT 140, including an actual SR and a desired SR. The actual SR indicates a present, measured value for the SR, and may be determined based upon a ratio of the input speed signal 33 and the output speed signal 35. The desired SR may correspond to a commanded, future value for the SR, which may be determined based upon monitored and estimated operating conditions related to an output power command, vehicle speed, engine torque and the like without limitation. The controller 12 controls the CVT 140 to achieve the desired SR by controlling pressures of one or both the primary pulley 36 and the secondary pulley 38 of the CVT 140. Controlling pressures of one or both the primary pulley 36 and the secondary pulley 38 of the CVT 140 can be achieved by controlling the drive and driven signals 53, 63 to apply requisite pressures to the first and second actuators 55, 65 to effect the desired SR, wherein the requisite pressures are preferably in the form of a primary pressure command and a secondary pressure command.

Figure 3:
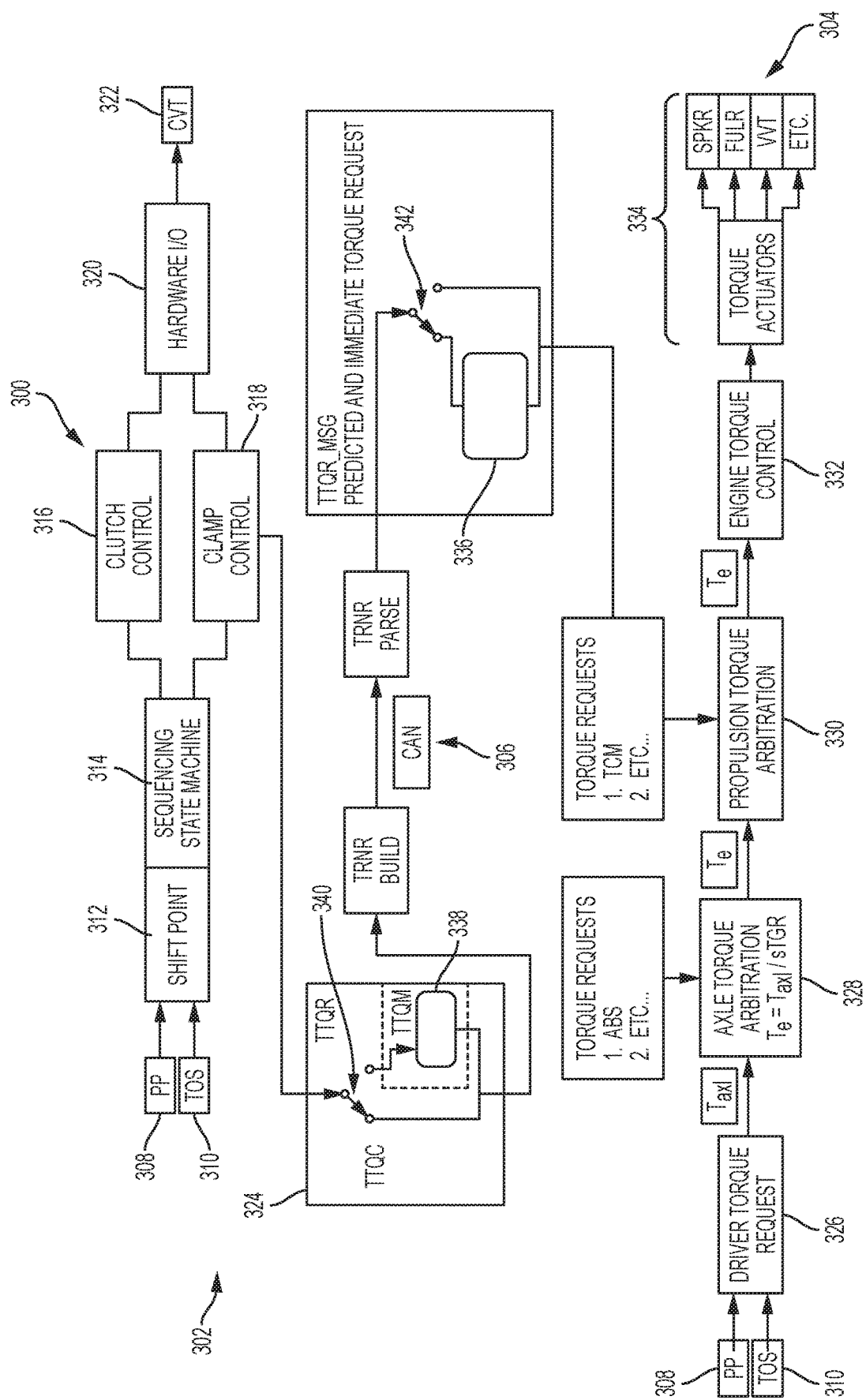
FIG. 3 schematically illustrates an exemplary control system 300 for a vehicle propulsion system in accordance with the present disclosure.

FIG. 3 schematically illustrates an exemplary control system 300 for a vehicle propulsion system in accordance with the present disclosure. The system 300 includes a transmission back bone 302 in communication with an engine back bone 304 over a controller area network 306. In an exemplary embodiment, the transmission backbone 302 may include components and operate in a manner similar to that described in co-pending, co-assigned U.S. patent application Ser. No. 15/596,219, the disclosure of which is incorporated herein in its entirety, for controlling the ratio of a continuously variable transmission.

In the exemplary embodiment of FIG. 3, the transmission back bone 302 may receive a driver accelerator pedal position signal 308 and a transmission output shaft speed signal 310. A shift point module 312 may determine a schedule or trajectory of transmission ratios and a sequencing state machine 314 may determine a progression of those transmission ratios. A clutch shift control module 316, a clutch fill and pressure module 318, and a hardware input/output module 320 may convert those ratios into control signals that may be sent to a continuously variable transmission 322 which may then operate accordingly in response to those signals.

The clutch fill and pressure control module 316 is also responsive to determine an amount of torque which may be required to implement a smooth shift. This amount of shift may be generically referred to as a positive torque request (PTR). The clutch fill and pressure control module 316 forwards the PTR to a transmission torque arbitration module 324. The transmission torque arbitration module 324 may arbitrate the PTR and make it available on the controller area network (CAN) 306 for access by the engine back bone 304.

The engine back bone 304 also may receive a driver accelerator pedal position signal 308 and a transmission output shaft speed signal 310 in a driver torque request module 326. The driver torque request module 326 may determine a driver requested amount of axle torque, $T_{axl}$. An axle torque arbitration module 328 may receive the driver requested axle torque and arbitrate that value based upon a number of factors and operating conditions and further convert the arbitrated value from an axle torque value into an engine torque value based upon the transmission ratio. A propulsion torque arbitration module 330 may then further arbitrate the torque request based upon a positive torque request which is received across the CAN from the transmission back bone 302 and generate an engine torque request which is provided to an engine torque control module 332. The engine torque control module 332 may then generate a set of command signals which may be forwarded to a set of actuators 334 in the engine, such as, for example, a spark control module, fuel control module, and the like without limitation such that the engine responds in a manner to supply the requested amount of engine torque.

As explained above, the clutch fill and pressure control module 316 is responsive to determine an amount of torque which may be required to implement a smooth shift. For example, in the event of a downshift, when the speed ratio is reduced, because the engine and associated driveline is always connected to the wheels of the vehicle through the continuously variable transmission, the rotational speed of the engine must increase. This requires the engine and driveline to rotationally accelerate. Since the engine has a rotational inertia, that acceleration consumes an amount of torque which may generally referred to as an inertia torque.

Figure 4:
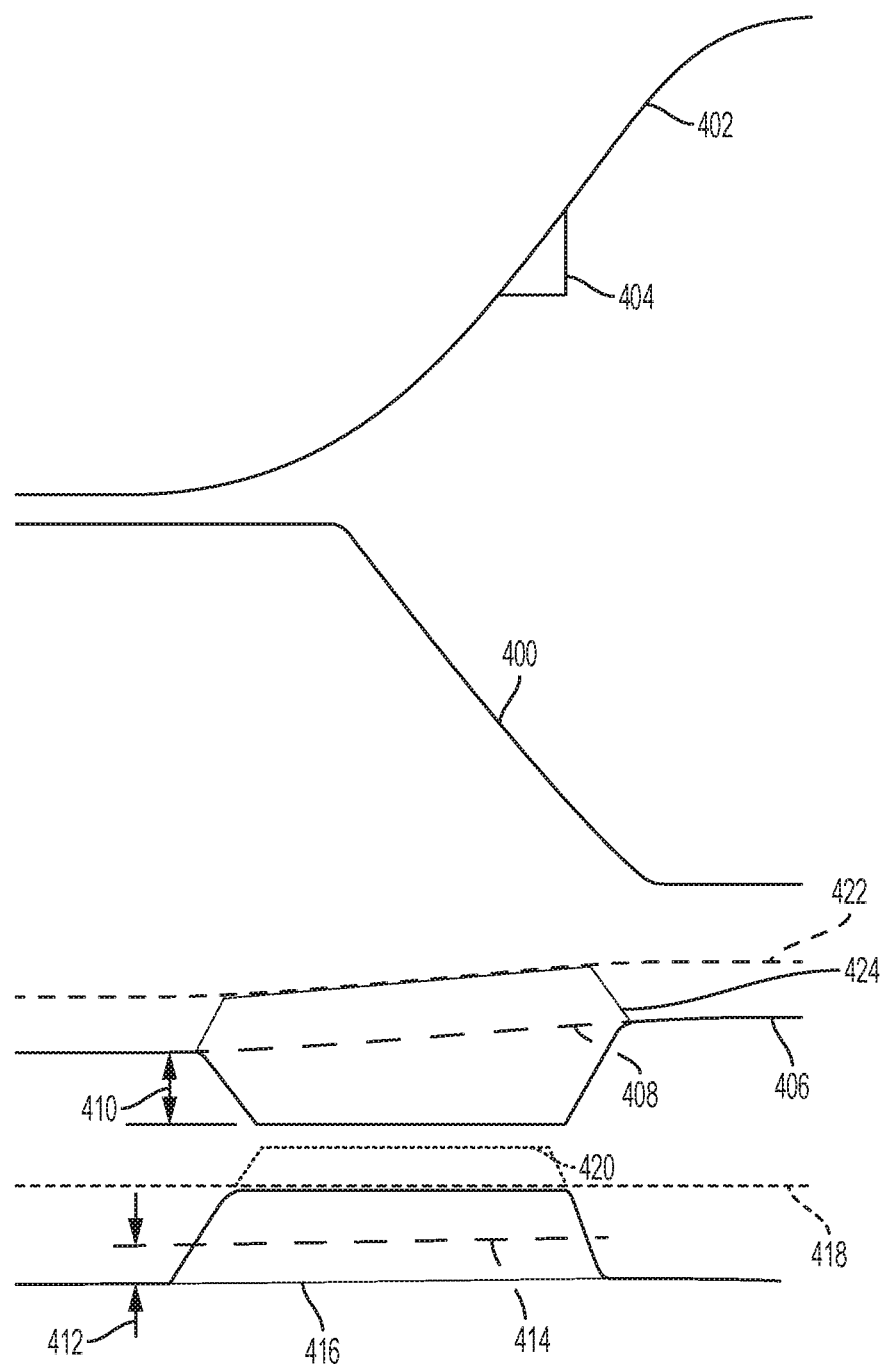
FIG. 4 illustrates a graph of signals from a continuously variable transmission undergoing a downshift in accordance with an exemplary embodiment of the present disclosure.

FIG. 4 illustrates a graph of signals from a continuously variable transmission undergoing a downshift in accordance with an exemplary embodiment of the present disclosure. A speed ratio signal 400 indicates a decrease of the CVT speed ratio throughout the downshift. As a result of the decrease in CVT speed ratio 400, the engine speed 402 must correspondingly increase. An engine acceleration 404 corresponds to the rate of change of the engine speed 402. Since the engine has a rotational inertia, the amount of torque which is consumed to accelerate the engine to follow the engine speed 402 may be determined. This problem is illustrated by axle torque line 406 which indicates an amount of axle torque which is less than the driver requested axle torque 408 by an amount 410 is indicated at line 408 corresponding to the inertia torque which is consumed by the acceleration 404 of the engine speed 402.

In an ideal situation, the amount of torque on the axle corresponds to the driver requested axle torque 408 which results in an amount of torque on the axle that remains substantially flat across the downshift event. In this manner, a smooth downshift may be achieved.

Axle torque and engine torque have corresponding values in each domain, axle and engine. The amount of additional axle torque 410 which is required to compensate for engine acceleration has a corresponding value of engine torque 412 which may be referred to as a positive torque request (PTR). The PTR 412 being an amount of engine torque above an amount of engine torque which is requested from the engine as a result of a driver request for axle torque. The driver requested engine torque 416 plus the PTR 412 results in a net engine torque 414 that provides a flat or smooth axle torque 408 in accordance with a driver axle torque request.

Referring back now to FIG. 3, it is important to ensure that the amount of torque which is provided to the axle does not exceed a predetermined amount. The transmission backbone 304 has conventionally included a torque request monitor 336 which has served to police the amount of torque request from the engine by the transmission backbone 302 across the controller area network 306. One purpose for this monitor is to ensure that any error, corruption and/or flaw in the transmission backbone 302 when generating and providing that torque request to the engine backbone 304 is corrected and not further promulgated. Conventionally, this torque request monitor 336 determines whether the torque request exceeds a predetermined threshold. That predetermined threshold may be based upon a torque request amount that would result in an acceleration of the vehicle of 0.2 Gs above that requested by the driver. While the present disclosure provides an exemplary specific predetermined threshold values, it is to be understood that the control system and method is not limited to any specific predetermined threshold value. If the torque request would exceed that threshold, then the monitor 336 would apply one or more timers. For example, the torque request monitor 336 would determine whether a ratio change has started within 200 milliseconds and, if so, whether the ratio change was complete within 900 milliseconds. Conventional system which generated a torque request which exceeded these conditions required the system to reject the request for additional torque entirely. That would result in the "torque hole" which is illustrated by the dip in axle torque 406 below the driver requested torque 408 as illustrated in FIG. 4. The result is a downshift in which there is an undesirable lack of power or torque, leading to an undesirable feeling to the driver. In response, the transmission backbone 302 would simply try again to generate another positive torque request to fill the torque hole, the conventional torque request monitor 336 may again reject that torque if it exceeded a predetermined threshold for more than a predetermined time. Thus, the downshift would not be smooth and drivability would suffer.

Another problem of these conventional systems is the inherent communication delay across the controller area network. This communication delay means that any information related to an alteration or change in the transmission takes time before the engine backbone learns about the alteration or change. By then, it may be too late or no longer relevant to attempt to make an adjustment in the engine backbone in response. The system would simply not be quickly responsive to transmission ratio changes. Further, to accommodate for this communication delay, the transmission backbone may be forced to make adjustments to the ratio change strategy such that the engine backbone might be more responsive to a delay accommodating transmission torque request. In either situation, the delay remains and responsiveness remains a problem.

In contrast to the conventional systems and methods, the exemplary embodiment 300 of FIG. 3, the transmission backbone 302 includes a positive torque monitor 338. The positive torque monitor 338 ensures that the positive torque request never reaches the predetermined threshold that would otherwise require the application of timers and resets. In an exemplary embodiment, the positive torque monitor 338 may include a table of predetermined torque limits for each of a set of engine accelerations and speed ratios which ensure that the positive torque request that is provided to the engine backbone 304 from the transmission backbone 302 across the controller area network 306 never results in a torque value which might otherwise exceed a predetermined threshold having a set of timers associated with it. In an alternative exemplary embodiment, the positive torque monitor 338 may include a processor which, in combination with an instruction set, may rely upon an equation or algorithm to determine an appropriate predetermined torque limit or limits. The positive torque monitor 338 may permit a torque request which corresponds to the sum of the driver requested torque and the positive torque request but does not exceed the sum of the driver requested torque and the predetermined torque limit which corresponds to the engine acceleration and ratio to pass directly to the engine backbone 304 and not require further policing and/or monitoring. In this manner, a torque request which is secured, protected, and rationalized is generated in the transmission backbone 302 and, therefore, that torque request is never subjected to timers, being reset, or rejected by the engine backbone 304.

The predetermined torque limits in the table in the positive torque request monitor 338 in the transmission backbone 302 may be calculated and/or determined through a calibration process that provides torque limits for each of a plurality of sets of engine accelerations and transmission ratios. In an exemplary embodiment, these predetermined torque limits in the positive torque request monitor 338 in the transmission backbone 302 may be less than a torque request amount that would result in an acceleration of the vehicle of 0.2 Gs above that requested by the driver. Referring now again to FIG. 4, the sum of the driver requested torque and the predetermined torque limit from the monitor table results in an engine torque limit 418. In the event that the transmission backbone 302 generates a positive torque request indicated at 420 that would exceed the engine torque limit 418, then the table in the monitor would set the torque request to the engine torque limit 418 and not above it. In this instance, the axle torque corresponding to the engine torque is illustrated in FIG. 4, where the engine torque limit 418 corresponds to an axle torque limit 422 and the axle torque 424 in that instance would increase to but not exceed the axle torque limit 422. In this manner, the exemplary embodiment ensures that enough additional torque (positive torque request) is provided to enable a smooth downshift but not so much as to result in the application of a number of additional protection algorithms which might otherwise adversely affect drivability. In general, those policing algorithms, which may have been created when only considering the use of a conventional clutch to clutch transmission and not a continuously variable transmission do not need to be applied at all. Continuously variable transmissions change ratios in a vastly different manner than a clutch to clutch transmission and may change ratio over an extended period of time that might easily result in exceeding those timers in those policing monitors which were designed only with clutch to clutch transmissions in mind. In contrast, conventional positive torque monitors may have permitted the engine torque to exceed a predetermined limit, but limit the amount of time that torque may exceed the limit. Thus, in those conventional systems, the engine torque may have actually reached the value indicated at 420 in FIG. 4. Indeed, conventional torque monitors may have not limited the torque request to any maximum value at all. In a clutch to clutch system, that may be acceptable as the transmission may appear to be temporarily disconnected from the engine during a ratio change because the connecting clutches may not have sufficient torque capacity to transfer any excess torque to the axle. In contrast, a continuously variable transmission is not likely to be disconnected from the engine during a ratio change.

In the exemplary embodiment of FIG. 3, the positive torque monitor 338 is in communication with a first switch 340 in the transmission backbone 302 and that the positive torque monitor 336 in the engine backbone 304 is in communication with a second switch 342. In the illustrated configuration of FIG. 3, the switch 340 bypasses the positive torque monitor 338 in the transmission backbone 302, which then requires that the second switch 342 connects the positive torque monitor 336 in the engine backbone 304. In order to ensure proper policing of the torque request, at least one of the torque monitors 338 and 336 cannot be bypassed. Preferably, in accordance with the present disclosure, the first switch 340 ensures that the positive torque monitor 336 in the transmission backbone 302 is used and the second switch 342 bypasses the positive torque monitor 336 in the engine backbone 304. In this manner, the full complement of advantages which are made possible through the exemplary embodiment of the present disclosure are obtained without extensive modification of existing systems to incorporate the features of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle propulsion system, the system comprising:
   a prime mover having a prime mover output shaft;
   a continuously variable transmission having a variator input shaft coupled to the prime mover output shaft and having a variator output shaft;
   a driver torque request module in communication with a driver input and for outputting a driver torque request;
   an engine control module set in communication with the prime mover; and
   a transmission control module set in communication with the continuously variable transmission and the engine control module set in the vehicle propulsion system, the transmission control module set including:
      a positive torque request module that generates a positive torque request; and
      a positive torque request monitor that limits a torque request from the transmission control module set to the engine control module set to a maximum of a predetermined threshold, wherein the torque request is a sum of the driver torque request and the positive torque request.

2. The system of claim 1, wherein the positive torque request module determines the positive torque request based upon an engine acceleration and an engine inertia.

3. The system of claim 2, wherein the positive torque request module determines the positive torque request during a decrease in speed ratio of the continuously variable transmission such that a net torque at an axle of the vehicle propulsion system substantially matches a driver requested axle torque.

4. The system of claim 3, wherein the driver requested axle torque corresponds to the driver torque request.

5. The system of claim 1, wherein the positive torque request monitor limits a torque request from the transmission control module set to the engine control module set to a maximum of a predetermined threshold from a table of predetermined threshold values.

6. The system of claim 5, wherein the positive torque request monitor determines the predetermined threshold from the table based upon an engine acceleration and a ratio of the continuously variable transmission.

7. A controller for a vehicle propulsion system in a vehicle, the controller comprising:
   an engine control module set in communication with the prime mover; and
   a transmission control module set in communication with the continuously variable transmission and the engine control module set in the vehicle propulsion system, the transmission control module set including:
      a positive torque request module that generates a positive torque request; and
      a positive torque request monitor that limits a torque request from the transmission control module set to the engine control module set to a maximum of a predetermined threshold, wherein the positive torque request monitor limits the torque request from the transmission control module set to the engine control module to a torque request that is a sum of the driver torque request and the positive torque request and to a maximum of the predetermined threshold.

8. The system of claim 7, wherein the positive torque request module determines the positive torque request based upon an engine acceleration and an engine inertia.

9. The system of claim 8, wherein the positive torque request module determines the positive torque request during a decrease in speed ratio of the continuously variable transmission such that the net torque at an axle of the vehicle propulsion system substantially matches a driver requested axle torque.

10. The system of claim 9, wherein the driver requested axle torque corresponds to the driver torque request.

11. The system of claim 7, wherein the positive torque request monitor that limits a torque request from the transmission control module set to the engine control module set to a maximum of a predetermined threshold from a table of predetermined threshold values.

12. The system of claim 11, wherein the positive torque request monitor determines the predetermined threshold from the table based upon an engine acceleration and a ratio of the continuously variable transmission.

13. A method for controlling a vehicle propulsion system which includes a prime mover having a prime mover output shaft, a continuously variable transmission having a variator input shaft coupled to the prime mover output shaft and having a variator output shaft, the method comprising:
   generating a positive torque request in a transmission control module set; and
   monitoring a torque request from the transmission control module set to an engine control module set to ensure that the torque request does not exceed a predetermined threshold, wherein the torque request comprises a sum of the positive torque request and a driver torque request.

14. The method of claim 13, wherein generating the positive torque request is during a decrease in speed ratio of the continuously variable transmission such that a net torque at an axle of the vehicle propulsion system substantially matches a driver requested axle torque.

15. The method of claim 14, wherein the driver requested axle torque corresponds to the driver torque request.

16. The method of claim 13, wherein the monitoring of the torque request to ensure that the torque request does not exceed a predetermined threshold further comprises referencing a table of predetermined threshold values.

17. The method of claim 16, wherein referencing the table is based upon an engine acceleration and a ratio of the continuously variable transmission.

* * * * *